J. M. CAYCE.
SHOE-FASTENING.
No. 176,927. Patented May 2, 1876.
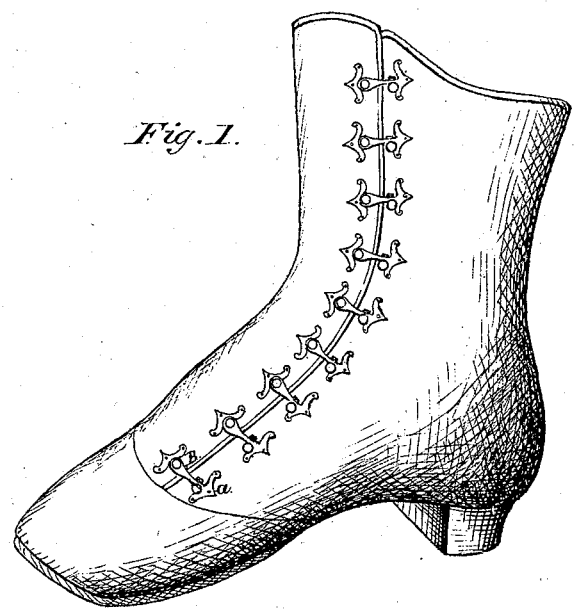
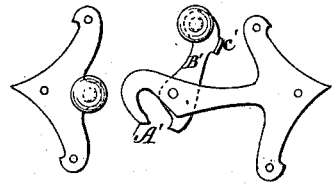
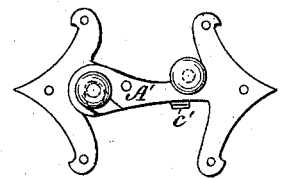
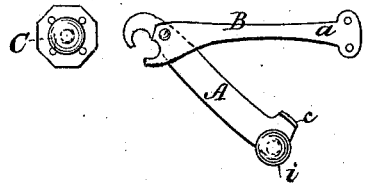
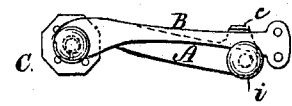

UNITED STATES PATENT OFFICE.

JOHN M. CAYCE, OF FRANKLIN, TENNESSEE, ASSIGNOR TO HIMSELF AND CHARLES A. BAILEY, OF SAME PLACE.

IMPROVEMENT IN SHOE-FASTENINGS.

Specification forming part of Letters Patent No. 176,927, dated May 2, 1876; application filed April 11, 1876.

*To all whom it may concern:*

Be it known that I, JOHN M. CAYCE, of Franklin, in the county of Williamson and State of Tennessee, have invented a new and Improved Shoe-Latchet; and I do hereby declare that the following is a full, clear, and exact description of the same.

This invention relates to an improved shoe fastening or latchet, formed essentially of two metal plates, one of which is hook-shaped to adapt it to catch upon a button or knob, while the other is pivoted thereto, and so constructed that when adjusted in a certain position it will prevent the hook becoming accidentally disengaged from the button, as hereinafter described.

In the accompanying drawing, forming part of this specification, Figure 1 is a perspective view of a child's gaiter, showing the manner of applying my improved latchet. Fig. 2 is a plan view of the component parts of the latchet, showing the hook in position to catch upon a button. Fig. 3 represents the same connected with a button. Figs. 4 and 5 are corresponding views of a modified form of the device.

The chief elements of my improved latchet are a flat hook, A, a plate, B, in the nature of a mousing attachment, and a knob or button, C.

The plate A is provided with a T-shaped or other form of shank, a, which is pierced with a suitable number of holes to adapt it for attachment to one of the shoe-flaps. The knob or button C may be secured to the opposite shoe-flap by a device of similar or other form.

The hook proper is pivoted to the free end of plate B, and lies flat upon its shank a. The hook is thus adapted to catch around the button C, and both parts (A B) lie flat upon the shoe-flap, as shown in Fig. 1.

The plate B acts as a mousing attachment for the hook A, in that it is so shaped at its free end as to close the open side of the hook when the latter is hooked around a button, as shown in Fig. 3. The button cannot, therefore, be disengaged from the hook until the latter is turned on its pivot into the position shown in Fig. 2.

The hook is held closed, as shown in Fig. 3, by means of a small rib or lug, c, formed on the end of its shank or longer arm, the shank passing underneath the plate B, and the lug then engaging the side of the latter, as in Fig. 3.

It is necessary to secure the parts in this position in order to prevent the hook being accidentally detached from the button, and thereby allowing the shoe to become unfastened while being worn.

For convenience of operating the hook A, a knob, i, is attached to the end of the shank. In order to pass the hook around a button, C, when the device is constructed as above described, it is obviously necessary to first draw the flaps close together by hand. The hook is then turned on its pivot until the lug c passes underneath the shank of the plate B, and the parts then assume the position shown in Figs. 1 and 3.

The hook thus operates as a lever of the first order, and draws the button, and the flap to which it is attached, toward the flap to which the plate B is attached. It is therefore preferable to provide certain classes of shoes, which are designed to fit very tightly, with a latchet, constructed as above described.

For other kinds the modifications shown in Figs. 4 and 5 will be suitable.

In this case the hook A', and not the plate B', is provided with a T-shaped shank, a', by which it is secured to a shoe-flap. The plate is pivoted to the hook in such proximity to the open side of the same as to close it when the parts are adjusted in the position shown in Fig. 5.

The parts A' B' may be curved to adapt them to conform to the convexity of the foot or ankle, or they may be made of material sufficiently elastic to adapt them to conform to the foot when the shoe-flaps are fastened.

What I claim is—

1. In a shoe-latchet, the combination of the hook and mousing-plate, pivoted together, and one of them adapted to be attached to the shoe-flap, the other movable and provided with a lug for holding the parts locked together, substantially as shown and described.

2. The hook-lever A', constructed with the hook proper in the same plane with the shank, and pivoted to the arm B', as shown and described, whereby it is adapted to swing horizontally, as and for the purpose specified.

JOHN M. CAYCE.

Witnesses:
A. W. HART,
CHAS. A. PETTIT.